United States Patent [19]

Kirtley, Jr. et al.

[11] 4,087,711
[45] May 2, 1978

[54] ROTATING ELECTRIC MACHINE HAVING A TOROIDAL-WINDING ARMATURE

[75] Inventors: James L. Kirtley, Jr., Brookline; Joseph L. Smith, Jr., Concord, both of Mass.

[73] Assignee: Massachusetts Institute of Technology, Cambridge, Mass.

[21] Appl. No.: 661,912

[22] Filed: Feb. 27, 1976

Related U.S. Application Data

[63] Continuation of Ser. No. 517,289, Oct. 22, 1974, abandoned, which is a continuation of Ser. No. 372,129, Jun. 21, 1973, abandoned.

[51] Int. Cl.² .............................................. H02K 3/00
[52] U.S. Cl. ...................................... 310/184; 310/10; 310/52; 310/164
[58] Field of Search ................ 310/10, 40, 52, 54, 310/165, 46, 49, 164, 166, 86, 201, 202, 254, 257, 180, 184, 105, 171, 201–207, 45, 198

[56] References Cited

U.S. PATENT DOCUMENTS

| | | | |
|---|---|---|---|
| 3,214,717 | 10/1965 | Brodersen | 310/267 |
| 3,242,418 | 3/1966 | Mela | 310/40 |
| 3,368,087 | 2/1968 | Madsen | 310/52 |
| 3,405,290 | 10/1968 | Halas | 310/40 |
| 3,508,094 | 4/1970 | Byrne | 310/86 |
| 3,644,766 | 2/1972 | Hughes | 310/165 |
| 3,648,082 | 3/1972 | MacNab | 310/10 |
| 3,679,920 | 7/1972 | MacNab | 310/52 |
| 3,743,875 | 7/1973 | Smith | 310/201 |

*Primary Examiner*—R. Skudy
*Attorney, Agent, or Firm*—Arthur A. Smith, Jr.; Robert Shaw

[57] ABSTRACT

A rotating electric machine having an armature winding wound in the form of a toroid. The toroidal winding consists of a plurality of sectors which are wound in alternating sense and are disposed circumferentially around a rotor. The sectors are interconnected around the torus to form a substantially continuous circumferential voltage gradient which is approximately sinusoidal in the circumferential direction.

17 Claims, 6 Drawing Figures

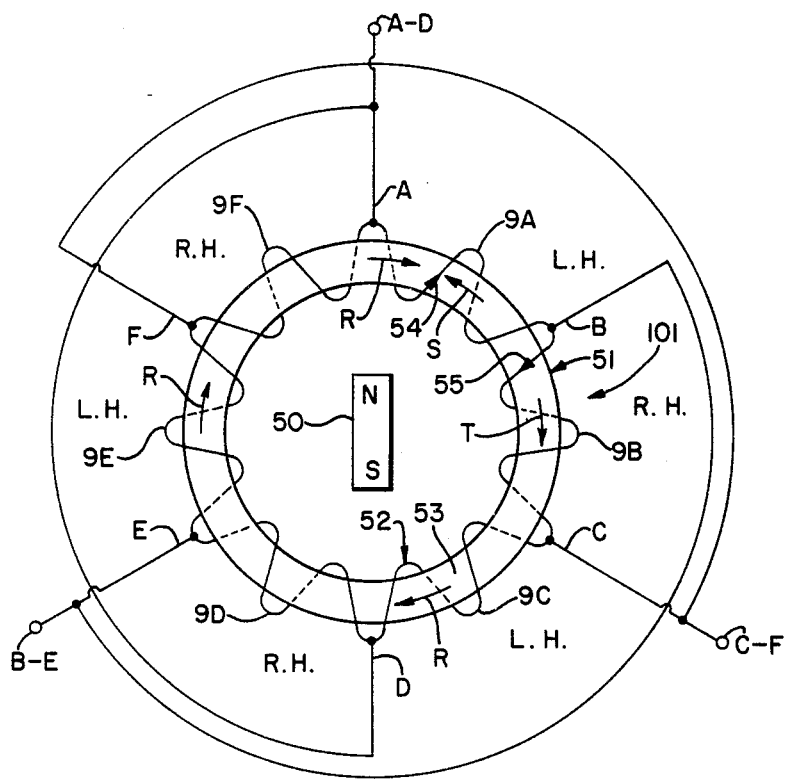
FIG. 1
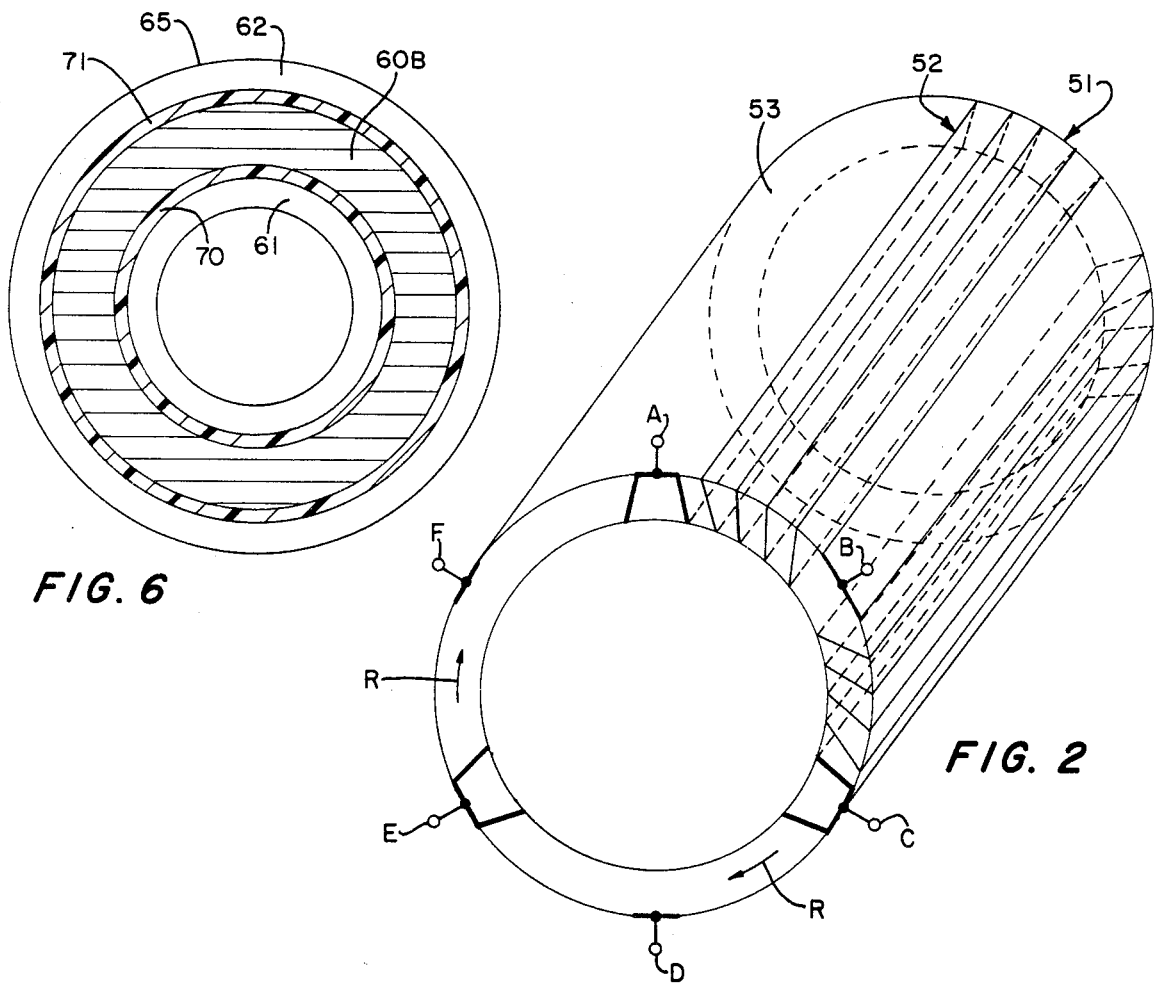
FIG. 6
FIG. 2

ROTATING ELECTRIC MACHINE HAVING A TOROIDAL-WINDING ARMATURE

This is a continuation of application Ser. No. 517,289 filed Oct. 22, 1974 (now abandoned) which is, in turn, a continuation of application Ser. No. 372,129, filed June 21, 1973 (now abandoned).

The present invention relates to rotating electric machines in which the armature comprises a toroidal winding.

A number of technical developments and economic factors of rather recent vintage indicate the possibility of providing high voltage, high power rotating electrical machines such as, for example, large alternators, and the need therefor. The technical developments relate mostly to the advent of superconducting machines which can provide very high magnetomotive force and, therefore, high-power densities—even in air-core systems. Also the elimination of step-up transformers at generating plants, is highly desirable.

Accordingly, it is a principal object of the present invention to provide a high power density rotating electric machine particularly adapted to permit generation of very high voltages, of the order of hundreds of thousands of volts.

Another object is to provide a machine of the foregoing nature that can employ superconducting technology.

Still another object is to provide such a machine with normally-conducting electrical elements.

Still another object is to provide an armature for such machines wherein the armature winding has a controlled voltage gradient, one that is substantially continuous in nature or at least graded in reasonably small and controlled voltage steps.

A further object is to provide a machine of more general use as well.

These and still further objects are evident in the description that follows and in the appended claims.

The objects of the invention are attained by a rotating electric machine that includes a rotatable field and an armature with a toroidal winding comprising a plurality of spectors wound in alternating sense and disposed in a circular configuration, the sectors being interconnected to form a substantially continuous voltage gradient circumferentially. In the preferred form, the machine has a superconducting rotor winding as the inner element of a nested structure, the armature being the outer element of the two; and there is further provided an eddy-current shield disposed outward from the armature and operable to confine the magnetic fields within the machine as well as to direct the rotor field into the inner core region of the armature.

The invention is hereinafter discussed upon reference to the accompanying drawing in which:

FIG. 1 is a schematic representation of a rotating electric machine embodying the present concepts and is particularly intended to show the concept of "alternating sense" winding sectors in the armature of the machine;

FIG. 2 is an isometric diagrammatic view of an armature embodying the concepts shown schematically in FIG. 1;

FIG. 6 is another schematic end view of an armature, like the armature in FIG. 3, except having a circumferentially continuous laminated magnetic annular core insulated from the winding by cylindrical insulated layers.

Figure 3:
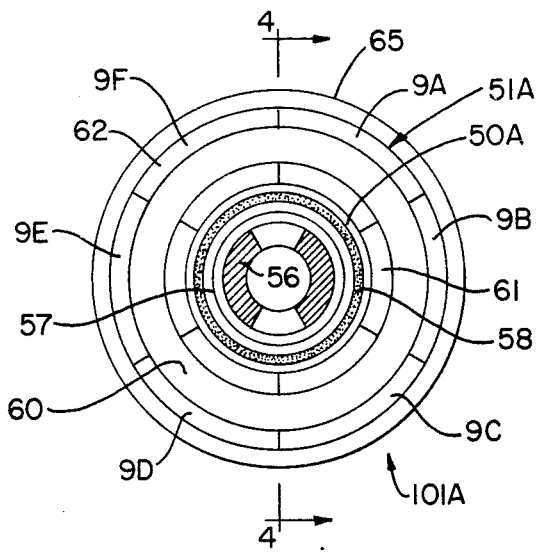
FIG. 3 is a schematic, end-view representation of a superconducting machine, like the machine in FIG. 1 and having rotating superconducting field winding.

There follows first an overall explanation of the invention with reference to the schematic representation of FIG. 1 which shows a rotating electric machine 101. The machine 101 can be an alternator or generator, or a motor, or it can be a synchronous condenser. It is assumed, to simplify this explanation, that it is a generator that comprises a rotatable field 50 (which is shown diagrammatically and can be a rotor with a superconducting field winding or a squirrel-cage construction, later described) and an armature 51.

The armature 51 has a toroidal winding 52 which may be wound about a magnetic or non-magnetic (e.g., air or other non-magnetic material core 53, as later explained. The armature comprises a plurality of sectors 9A, 9B . . . 9F helically wound in an alternating sense and disposed circumferentially around the rotor 50, i.e., disposed in a circular path, as shown in FIG. 1, the circumferential (or azimuthal) direction being represented by the arrows labeled R, Thus, the turns in the winding sector 9A are indicated to be helically wound in the left-hand direction (L.H.) and the turns in the immediately adjacent sectors 9F and 9B are helically wound in the right-hand direction (R.H.). An electric current at any instant of time in the turn designated 54 of the sector 9A and in the direction of the arrow will create a magnetic field in the direction of the arrow shown at S, whereas in the sector 9B a current in the turn designated 55 and in the direction of the arrow will create a magnetic field in the direction of the arrow shown at T; that is what is meant by the term "alternating sense" herein. The apparatus 101 is a three-phase, two-pole machine with six phase belts constituted by the sector 9A-9F having output terminals A connected to D, B connected to E and C connected to F, as shown in FIG. 1, to provide machine terminals A-D, B-E, and C-F, respectively.

Although a two-pole machine is shown in FIG. 1, the principles herein disclosed are useful for a machine of any number of pole pairs. Also, apparatus 101 may be operated as a synchronous machine, or with the rotor 50 having a squirrel-cage construction the apparatus 101 could be operated as an induction motor. Anyway, the toroidal winding 52 thereby wound, with the sectors 9A . . . appropriately interconnected to form a closed loop as shown in FIG. 1, has a controlled voltage gradient circumferentially and that gradient is substantially continuous that is, the voltage for which individual turns need be insulated is only that required to insulate the turn from the other turns immediately adjacent or near thereto.

The armature 51 is shown diagrammatically in FIG. 2 in the form it would take in the actual apparatus later discussed.

Figure 4:
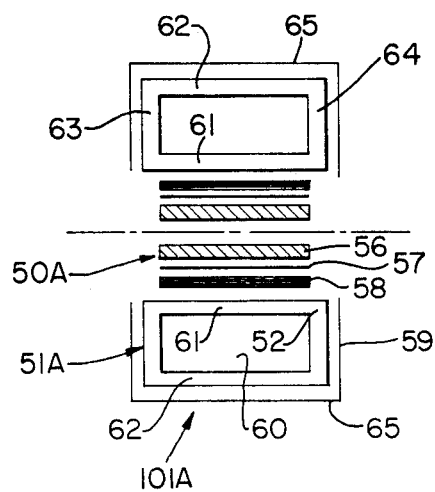
FIG. 4 is a view taken upon the line 4—4 in FIG. 3, looking in the direction of the arrows.

Although, as mentioned, the ideas herein disclosed conceptually have wide possible uses, they are of greatest use in connection with large synchronous alternators for generation of very high voltages and, more particularly, to superconducting machines. This combination is especially well adapted to produce very high voltage outputs of the order of hundreds of thousand volts, for example. The discussion in the next few paragraphs with reference to FIGS. 3 and 4 is directed to such superconducting generators or alternators which are designated 101A to indicate that they are a specific form of the machine 101, namely, that they are superconducting machines having air-core armatures. The representation in these two figures, as well as FIGS. 5 and 6, discussed later is diagrammatic.

The machine 101A has a rotatable field 50A having a field winding 56; and it has an armature 51A again comprising sectors 9A . . . of the armature winding 52. The rotor 50A includes a thermal shield 57 and an electromagnetic damper shield 58. The armature winding 52 has inner bars 61 and outer bars 62 connected by radial bars 63 and 64. In each sector, current in the inner bars travels axially in one sense at the time that current in the outer bars of the same sector travels axially in the opposite sense, sense here being used to denote the direction along the shaft of the machine. The radially directed end turns 63 and 64 are, of course, merely continuations of the inner and outer bars 61 and 62, respectively. The toroidal armature winding shown herein is a single layer. It will be appreciated that the same principles are involved in multilayers (or multi-turns/bar). The core labeled 60 in the machine 101A is an air-core.

Outward from the armature 51A there is a highly conductive eddy-current shield 65 which acts to prevent the high magnetic field of the rotor from entering the environment adjacent the machine, but it serves the further useful purpose, through induced image currents, of enhancing the azimuthal magnetic field in the armature, thus increasing the coupling between the armature winding 52 and the field winding 56. Said another way, the eddy-current shield 65 forces the field of the rotor 50A into the open annular space 60 which constitutes the air core of the armature 51A, thereby to increase the flux linked by the armature winding 52.

Figure 5:
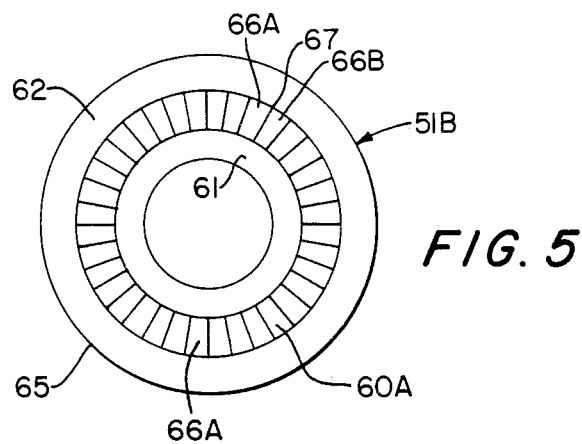
FIG. 5 is a schematic end-view of an armature, like the armature in FIG. 3, except having a segmented and insulated magnetic annular core.

In between the inner and the outer armature winding bars, there may be the toroidal core of ferromagnetic material shown at 60A in FIG. 5. This core is not required for the machine to operate at all, but will enhance the operation. The core 60A may consist of a number of wedge-shaped segments laminated ferromagnetic material 66A, 66B . . ., insulated from one another in the azimuthal direction by insulation 67 . . . Each segment operates at about the potential of the armature conductors or bars above and below it, and so no part of the core 60A has a large difference in potential from the potential of nearby conductors or adjacent core segments. For a further detailed discussion of segmented cores, see application for Letters Pat. Ser. No. 372,130, filed June 21, 1973, (Kirtley, Jr.) now U.S. Pat. No. 3,999,093.

In FIG. 6 the inner and outer winding bars are again labeled 61 and 62. There is an insulating cylinder 70 between the inner bars 61 and the magnetic iron core which is designated 60B, and there is an outer cylindrical insulator 71 between the core 60B and the outer bars 62; the core 60B in this embodiment is continuously electrically conductive in the circumferential direction, and laminated. The cylinders 70 and 71 must withstand full machine potential; this configuration still requires less insulation than a conventional machine in with each bar must be wrapped with sufficient insulation to withstand full machine potential.

Some of the advantages of the invention described here are now noted. At no point in the machine is there an inherently high potential gradient from turn to turn. If insulating structures are used, each bar must be insulated only from its immediate neighbors, and its immediate neighbors will have a potential difference therefrom, at most, only a few times the volts per turn rating of the machine. In addition, at the inner periphery of the winding the bars must be insulated from the electromagnetic damper shield 58 and at the outer periphery of the machine each of the bars must be insulated from the highly conductive image shield 65. Both of these insulation layers must be able to withstand full machine potential. The solenoidal winding has the advantage over the high voltage winding scheme disclosed in application Ser. No. 166,083 filed July 26, 1971 (now U.S. Pat. No. 3,743,875) by the present inventors in that at no point within this winding is there a high potential gradient to be insulated for, as there is in the previous scheme (i.e., at the end turns). In the machine described here, there are high potential differences only from the armature winding to internal and external shells. Furthermore, winding the armature torus in the alternating sense described acts to distribute mechanical forces relatively evenly and symmetrically about the machine 101 circumferentially—especially under phase unbalanced loading—and this is a most important consideration in very large generators.

A further comment is in order. The machines discussed so far are of the nested construction. The ideas disclosed may be used also for disc-type construction wherein the rotor and stator are axially displaced, rather than radially.

Further modifications will occur to persons skilled in the art and all such are considered to be within the spirit and scope of the invention as defined by the appended claims.

What is claimed is:

1. A rotating electric machine that comprises, in combination a field rotor, an armature having a toroidal core and a continuous closed loop high voltage polyphase winding on the core that comprises a plurality of sectors disposed end-to-end circumferentially around the rotor, said sectors being interconnected in immediate adjacency circumferentially to one another to form a winding which establishes a substantially continuous voltage gradient circumferentially, immediately adjacent sectors of the closed-loop polyphase winding being wound in alternating left and right hand sense to provide, in an operating machine, magnetic flux linkage in each sector which is oppositely directed to the flux linkage in sectors immediately adjacent thereto, insulation between adjacent turns of said winding being only that necessary to electrically insulate at most only a few times the volts per turn rating of the machine.

2. An electric machine as claimed in claim 1 in which the rotor mounts a superconducting field winding.

3. An electric machine as claimed in claim 2 in which the toroidal core of the armature contains a non-magnetic, non-conducting structure which supports the armature winding, said machine having a conductive eddy-current shield disposed radially outward and surrounding the toroidal winding and insulated therefrom.

4. An electric machine as claimed in claim 1 in which the toroidal core of the armature winding contains a segmented annular structure of magnetic material, segments of the core operating at substantially the potential of the portions of the armature winding adjacent thereto.

5. An electric machine as claimed in claim 4 having a conductive eddy-current shield disposed radially outward and surrounding the armature winding and insulated therefrom.

6. An electric machine as claimed in claim 1 in which the rotor comprises a ferromagnetic core and an ambient temperature field winding.

7. An electric machine as claimed in claim 6 in which the ambient temperature field winding is an induction winding.

8. An electric machine as claimed in claim 1 in which the toroidal core of the armature winding is an air core, said machine having an eddy-current shield disposed outward from the armature winding and adapted to enhance coupling between the rotor and the armature winding.

9. An electric machine as claimed in claim 1 in which said armature winding is adapted for connection to a polyphase power supply for operation as a motor.

10. An electric machine as claimed in claim 1 in which the armature winding is adapted to operate as a polyphase generator.

11. An electric machine as claimed in claim 1 in which the armature winding is adapted to connect to a polyphase bus for operation as a synchronous condenser.

12. An electric machine as claimed in claim 1 in which the toroidal core of the armature winding contains an annular structure, continuous in the circumferential direction and laminated and insulated from the winding.

13. An electric machine as claimed in claim 12 having a conductive eddy-current shield disposed radially outward and surrounding the armature winding and insulated therefrom.

14. An electric machine as claimed in claim 1 wherein means is provided to insulate the exterior of the winding against full machine potential.

15. An electric machine as claimed in claim 14 wherein the core is continuously electrically conductive in the circumferential direction and wherein insulation is provided between the conductive core of the winding, said insulation being capable of withstanding full machine potential.

16. An electric machine as claimed in claim 14 in which the toroidal core of the armature is a non-magnetic and non-conductive structure which supports the armature winding.

17. An electric machine as claimed in claim 14 wherein the toroidal core of the armature comprises a segmented annular structure of magnetic material, segments of the core being electrically insulated from one another in the azimuthal direction so that segments of the core operate at substantially the potential of the portions of the winding adjacent thereto, thereby to provide a core wherein the insulation surrounding each core segment is substantially below that needed to withstand full machine potential.

* * * * *